United States Patent
Kantanen et al.

(10) Patent No.: US 10,112,800 B2
(45) Date of Patent: Oct. 30, 2018

(54) BRAKE, AND ELEVATOR SYSTEM

(71) Applicant: KONE CORPORATION, Helsinki (FI)

(72) Inventors: Kaisa Kantanen, Riihimäki (FI); Timo Vlasov, Lahti (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/683,263

(22) Filed: Aug. 22, 2017

(65) Prior Publication Data

US 2017/0349401 A1    Dec. 7, 2017

Related U.S. Application Data

(63) Continuation of application No. 14/851,989, filed on Sep. 11, 2015, now Pat. No. 9,764,924, which is a continuation of application No. PCT/FI2014/050210, filed on Mar. 21, 2014.

(30) Foreign Application Priority Data

Mar. 26, 2013 (FI) .................................... 20135294

(51) Int. Cl.
| | |
|---|---|
| *B66B 1/36* | (2006.01) |
| *B66B 5/00* | (2006.01) |
| *B66B 11/04* | (2006.01) |
| *F16D 66/02* | (2006.01) |
| *B66D 5/30* | (2006.01) |
| *F16D 63/00* | (2006.01) |

(52) U.S. Cl.
CPC .............. *B66B 1/36* (2013.01); *B66B 5/0031* (2013.01); *B66B 11/04* (2013.01); *B66D 5/30* (2013.01); *F16D 63/008* (2013.01); *F16D 66/023* (2013.01); *H05K 999/99* (2013.01)

(58) Field of Classification Search
CPC ......... B66B 1/36; B66B 5/0031; B66B 11/04; B66D 5/30; F16D 19/02; F16D 19/04
See application file for complete search history.

(56) References Cited

U.S. PATENT DOCUMENTS

| | | | |
|---|---|---|---|
| 1,612,302 | A | 12/1926 | Matthews |
| 3,605,085 | A | 9/1971 | Fiorita |
| 4,136,634 | A | 1/1979 | Wilson |
| 4,194,606 | A | 3/1980 | Beneke |
| 4,476,965 | A | 10/1984 | Brown, Jr. et al. |
| 5,101,939 | A | 4/1992 | Sheridan |
| 5,154,261 | A | 10/1992 | Tanaka et al. |

(Continued)

FOREIGN PATENT DOCUMENTS

| | | |
|---|---|---|
| JP | 55-23393 | 2/1980 |
| JP | 2012-6697 A | 1/2012 |

(Continued)

*Primary Examiner* — Michael A Riegelman
(74) *Attorney, Agent, or Firm* — Birch, Stewart, Kolasch & Birch, LLP

(57) ABSTRACT

A brake, which includes a frame part of the brake, an armature part movably supported on the frame part, and attached to the frame part a limit switch, the switching state of which changes when movement is exerted on the limit switch in the operating direction of the limit switch. The brake also includes a measuring pin that is movably supported on the frame part of the brake and that is separate from the armature part, which measuring pin is connected to the limit switch.

15 Claims, 4 Drawing Sheets

(56) References Cited

U.S. PATENT DOCUMENTS

| | | |
|---|---|---|
| 5,255,760 A | 10/1993 | Lamb et al. |
| 5,791,442 A | 8/1998 | Arnold |
| 6,135,029 A | 10/2000 | Oberjohn |
| 6,460,659 B1 | 10/2002 | Schaffer et al. |
| 7,398,863 B2 | 7/2008 | Liebetrau et al. |
| 2005/0199451 A1 | 9/2005 | Zimmer et al. |
| 2008/0308360 A1 | 12/2008 | Weinberger et al. |
| 2010/0065383 A1 | 3/2010 | Hein et al. |
| 2010/0300816 A1 | 12/2010 | Linke et al. |
| 2014/0076675 A1 | 3/2014 | Olkkonen et al. |
| 2014/0291075 A1 | 10/2014 | Vlasov |
| 2015/0329318 A1 | 11/2015 | Cambruzzi et al. |
| 2016/0102718 A1 | 4/2016 | Polack et al. |

FOREIGN PATENT DOCUMENTS

| | | |
|---|---|---|
| JP | 2012-180194 A | 9/2012 |
| JP | 2013-216415 A | 10/2013 |
| WO | WO 00/20320 A1 | 4/2000 |

BRAKE, AND ELEVATOR SYSTEM

CROSS REFERENCE TO RELATED APPLICATIONS

This application is a Continuation of U.S. application Ser. No. 14/851,989, filed Sep. 11, 2015, which is a Continuation of PCT International Application No. PCT/FI2014/050210, filed on Mar. 21, 2014, which claims priority under 35 U.S.C. 119 (a) to Patent Application No. 20135294, filed in Finland on Mar. 26, 2013, all of which are hereby expressly incorporated by reference into the present application.

FIELD OF THE INVENTION

The invention relates to solutions for measuring the operation of a brake.

BACKGROUND OF THE INVENTION

Conventionally, the operation of a brake of a hoisting machine of an elevator is measured with a limit switch, which is fixed to the side of the brake. The limit switch is configured to measure the movement of the armature part with respect to the frame part of the brake. The limit switch comprises a moving arm, which is attached to a contact of th1 e limit switch in such a way that the contact opens and closes as the arm moves.

The limit switch is attached to the frame part of the brake and the arm is fixed to the armature part moving in relation to the frame part.

The movement of the armature part is seldom straight with respect to the frame part, and typically the armature part strikes obliquely against the frame part of the brake. In this case the movement can also be smaller on one side of the brake than on the other side. If the limit switch is on the side with small movement, observation of the movement is difficult.

Aim of the Invention

The aim of the invention is to disclose a solution that improves the reliability of measurement of the operation of a brake.

To achieve this aim the invention discloses a brake according to claim 1 and also an elevator system according to claim 12. The preferred embodiments of the invention are described in the dependent claims. Some inventive embodiments and inventive combinations of the various embodiments are also presented in the descriptive section and in the drawings of the present application.

SUMMARY OF THE INVENTION

One aspect of the invention is a brake, which comprises a frame part of the brake, an armature part movably supported on the frame part, which armature part is configured to be movable between a braking position and a releasing position, and also a limit switch attached to the frame part, the switching state of which limit switch changes at the operating point of the limit switch. The brake further comprises a measuring pin that is movably supported on the frame part of the brake and that is separate from the armature part, which measuring pin is connected to the limit switch and is configured to engage with the movement of the armature part in the operating direction of the limit switch, in the operating range between a braking position and a releasing position, which operating range the operating point of the limit switch is configured to divide into sections of the operating range, of which the switching state of the limit switch in the first section indicates a braking position and the switching state of the limit switch in the second section indicates a releasing position.

The phrase "the measuring pin is configured to engage with the movement of the armature part in the operating direction of the limit switch" means that the measuring pin is configured to move while supported on the frame part of the brake always in the operating direction of the limit switch and in such a way that the measuring pin moves when the armature part moves in the operating direction of the limit switch, or the movement of the armature part has a component in the direction of the operation of the aforementioned limit switch. Since the measuring pin movably supported on the frame part of the brake is separate from the armature part, the armature part is able to turn and if necessary also to displace in relation to the measuring pin. This means that a change in the position of the armature part, or an asymmetrical movement of it, at different points of the armature part does not prevent movement of the measuring pin and consequently does not disrupt operation of the limit switch.

In a preferred embodiment of the invention in the frame part of the brake is a space for the measuring pin. In one preferred embodiment of the invention the brake comprises a thruster spring fitted between the frame part of the brake and the measuring pin for engaging the measuring pin with the armature part. In a preferred embodiment of the invention both the measuring pin and the thruster spring are disposed in the aforementioned space in the frame part of the brake. In this case the measuring pin and also the thruster spring are better protected from blows both during installation of the brake and during its operation.

In one preferred embodiment of the invention both the measuring pin and the limit switch are disposed in the aforementioned space in the frame part of the brake. In this case also the limit switch is better protected from blows both during installation of the brake and during its operation. In addition, a limit switch in the frame part can more easily be protected e.g. against dirt and/or humidity.

In one preferred embodiment of the invention the aforementioned space is inside the frame part, and the measuring pin is configured to engage with the detent surface of the air gap of the brake, on the armature part side. This means that the measuring pin can be configured to measure the movement of the armature part from the detent surface on the armature part side of the air gap inside the brake, where the movement is more even than in the edge areas of the brake, and which measuring point consequently enables a reliable measurement result.

In one preferred embodiment of the invention the measuring pin comprises an arrow-shaped tip part, the tip of which is configured to press against the armature part. This means that the contact surface of the sharp tip of the measuring pin against the armature part is extremely small, and consequently a possible position error of the armature part does not disrupt or distort movement of the measuring pin.

In one preferred embodiment of the invention the measuring pin is separate from the limit switch. In a preferred embodiment of the invention the aforementioned measuring pin, which is separate from the limit switch, is configured to press against the limit switch. This means that the measuring pin is able to incline freely with respect to the limit switch, and inclination of the measuring pin does not cause torsion in the arm of the contact of the limit switch. In some other embodiments the measuring pin is fixed to the limit switch.

This is possible because the movement of the measuring pin is configured to occur in the operating direction of the limit switch and movement of the measuring pin does not in this case cause torsion in the limit switch.

In one preferred embodiment of the invention the brake comprises an adjustment means, with which the distance of the limit switch from the armature part is adjusted. This means that the operating point of the limit switch can be adjusted to be correct for ensuring reliable operation of the limit switch.

In one preferred embodiment of the invention the limit switch is fixed to the frame part with an adjustment means. This means that with the adjustment means the position of the limit switch with respect to the frame part can be adjusted.

In one preferred embodiment of the invention the adjustment means comprises an adjusting plate, onto which the limit switch is fixed, and the adjusting plate is fixed to the frame part of the brake with adjustment screws, with which the distance of the adjusting plate from the armature part can be adjusted. This means that with the adjustment screws the distance of the adjusting plate can be adjusted and at the same time also the operating point of the limit switch can be precisely adjusted to be correct.

In one preferred embodiment of the invention the measuring pin is configured to slide along a guide surface in the frame part of the brake. This means that the measuring pin can be supported on a guide surface, which improves the directional stability of the movement of the measuring pin and prevents the measuring pin from moving in other than the operating direction of the limit switch.

The second aspect of the invention is an elevator system, which comprises an elevator car, a hoisting machine and also a traction rope traveling via the traction sheave of the hoisting machine, with which rope the elevator car is moved. The hoisting machine comprises a brake according to the description for braking the movement of the traction sheave of the hoisting machine.

The brake according to the invention improves the reliability of measurement of the movement of the armature part of a brake, in which case by utilizing the invention also the monitoring of the operating state of the brake can be improved. In some embodiments the brake according to the invention is used as a mechanical safety device of an elevator, such as a machinery brake of the hoisting machine of the elevator and/or as a car brake engaging with a guide rail of the elevator car. In this case the invention also improves the safety of the elevator system. In some embodiments the brake according to the invention is used as a mechanical safety device of an escalator or of a travelator. In this case the invention improves the safety of the escalator/travelator.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
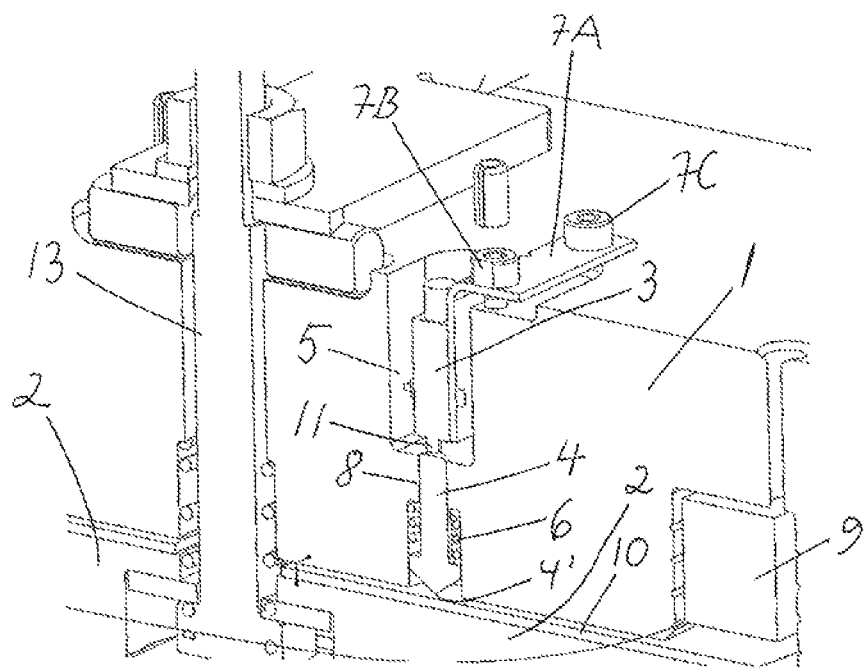
FIG. 1 presents a cross-section of brake according to one embodiment of the invention, as viewed obliquely from above.

FIG. 1 presents a cross-section of an electromagnetic machinery brake of a hoisting machine of an elevator. FIG. 1 presents only the features that are essential from the viewpoint of understanding the invention. The frame part 1 of the machinery brake is fixed to the stationary machine frame of the hoisting machine. The frame part 1 comprises the magnetizing coil 9 of the electromagnet. The armature part 2 of the machinery brake is movably supported on the frame part 1 with bolts 13 or corresponding in such a way that the armature part 2 is able to move along a determined trajectory in relation to the frame part 1. The brake has connection springs that exert a thrusting force between the frame part 1 and the armature part 2 in such a way that the armature part 2 displaces into the braking position when the connection springs press the armature part 2 against the braking surface of a rotating part of the hoisting machine The brake is opened by supplying current to the magnetizing coil 9 of the electromagnet. The current traveling in the coil 9 brings about a force of attraction between the frame part 1 and the armature part 2, pulling the armature part 2 into the releasing position away from the braking surface.

In this embodiment of the invention, a damping plate 10 fabricated from spring steel and moving along with the armature part 2 is fitted in connection with the armature part 2, in the air gap between the frame part 1 and the armature part 2, the purpose of which damping plate is to dampen disturbing noise produced by operation of the brake. In some other embodiments the brake is, however, implemented without the aforementioned damping plate 10.

The brake of FIG. 1 has a limit switch 3 fixed to the frame part 1, with which limit switch the operation of the brake is measured by measuring the movement of the armature part 2 of the brake. Movement if the armature part 2 is detected as a change in the switching state of the limit switch 3, i.e. as an opening or closing of the contact of the limit switch 3. The limit switch 3 has a moving arm 11, which is attached to a contact of the limit switch 3 in such a way that the contact opens/closes always at the operating point of the limit switch 3 when the arm 11 is moved in the intended operating direction.

The brake also comprises a measuring pin 4 that is movably supported on the frame part 1 of the brake and that is separate from the armature part 2/damping plate 10, which measuring pin is connected to the arm 11 of the limit switch 3 in such a way that the measuring pin 4 presses against the arm 11 of the limit switch.

The brake also has a thruster spring 6, which is fitted between the frame part 1 of the brake and the measuring pin 4 in such a way that the thruster spring 6 presses the measuring pin 4 into contact with the damping plate 10 that is in connection with the armature part.

The measuring pin 4 has an arrow-shaped tip part, the sharp tip 4' of which presses against the damping plate 10.

The measuring pin 4 and also the limit switch 3 are fitted into a space 5 inside the frame part in such a way that the measuring pin 4 and also the limit switch 3 are protected against external blows. In some embodiments the measuring pin 4 and also the limit switch 3 are enclosed in a space 5 in the frame part with a seal, which prevents the access of dirt and humidity into the aforementioned space 5.

The measuring pin 4 is configured to slide along the wall 8 of the space 5 in the intended operating direction of the arm 11 of the limit switch. In this case the measuring pin 4 pressed against the damping plate 10 engages with the movement of the damping plate 10, and consequently of the armature part 2, in such a way that the measuring pin 4 moves in the operating direction of the arm 11 when the damping plate 10 moves in the operating direction of the arm 11 or when the movement of the damping plate 10 has a component in the operating direction of the aforementioned arm 11. Since the sharp tip part 4' of the measuring pin 4 is separate from the damping plate 10, the damping plate 10 is able to turn and if necessary also to displace in relation to the measuring pin 4. This means that a change in the position of the damping plate 10, or an asymmetrical movement of it, does not produce torsion in the measuring pin 4 and consequently does not disrupt operation of the limit switch 3.

Figure 3:
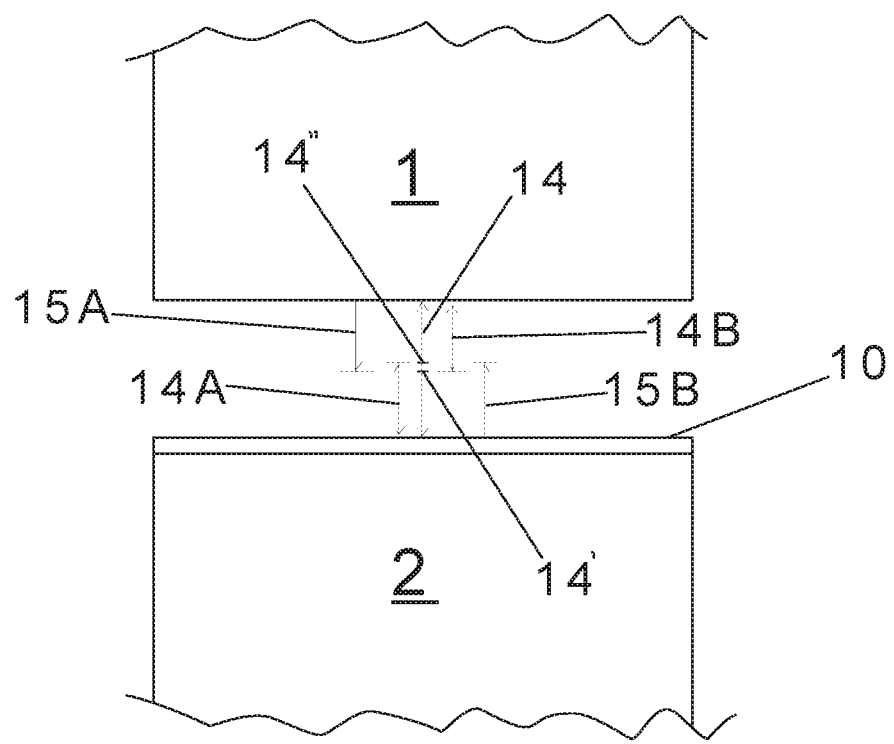
FIG. 3 presents the operating range of the measuring pin of FIG. 1.

The measuring pin 4 moves in the operating range 14 according to FIG. 3 between a braking position and a releasing position, when the armature part 2 displaces from the braking position into the releasing position and vice versa. The measuring pin 4 is dimensioned in such a way that the operating points 14', 14" of the limit switch 3 divide the operating range 14 into sections 14A, 14B, in which the limit switch 3 has different switching states. In the embodiment of FIG. 3 the limit switch 3 has two operating points 14', 14" for hysteresis. In the section 14A the switching state of the limit switch 3 indicates that the armature part 2 is situated in a braking position, and in the section 14B the switching state of the limit switch 3 indicates that the armature part 2 is situated in a releasing position.

When the measuring pin 4 moves in the direction of the arrow 15A away from the frame part 1, on reaching the first operating point 14' the switching state of the limit switch 3 changes to indicate a braking position. Correspondingly, when the measuring pin 4 moves in the opposite direction 15B towards the frame part 1, on reaching the second operating point 14' the switching state of the limit switch 3 changes to indicate a releasing position. In a second embodiment the limit switch 3 has only one operating point, which divides the operating range 14 into two sections 14A, 14B. On the one side of the operating point in the section 14A the operating state of the limit switch 3 indicates in this case a braking position and on the other side 14B the operating state of the limit switch 3 indicates a releasing position.

The measuring pin 4 in the brake of FIG. 1 presses against the surface of the damping plate 10 in the air gap of the brake. This is advantageous because the movement of the damping plate 10/armature part 2 in the area of the air gap inside the brake is more even than in the edge area of the brake, in which case a more reliable measurement result is obtained from inside the brake.

Figure 2:
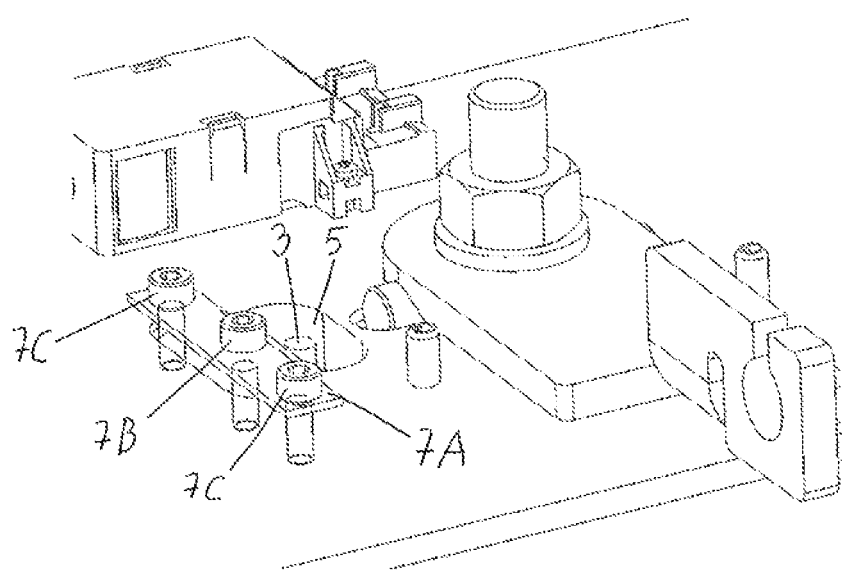
FIG. 2 presents a top view of the brake of FIG. 1.

The brake of FIG. 1 also comprises an adjustment means, with which the operating point of the limit switch 3 is adjusted by adjusting the distance of the limit switch 3 from the armature part 2. An adjusting plate 7A, to which the limit switch 3 is fixed, functions as an adjustment means. The adjusting plate 7A is further fixed to the frame part 3 with screws 7B, 7C with which the distance of the adjusting plate 7A from the armature part 2 is adjusted. The screw fixing of the adjusting plate 7A is presented in more detail in FIG. 2. A rough distance adjustment of the adjusting plate 7A is made by adding washers to the fixing screws 7C at the ends of the adjusting plate, and a fine adjustment is implemented with the adjustment screws 7B in the center of the plate 7A.

The armature part 2 of the brake can be implemented e.g. as the brake shoe of a shoe brake, as brake calipers of a car brake or as a brake pad of a disc brake that engages with the brake disc.

Figure 4:
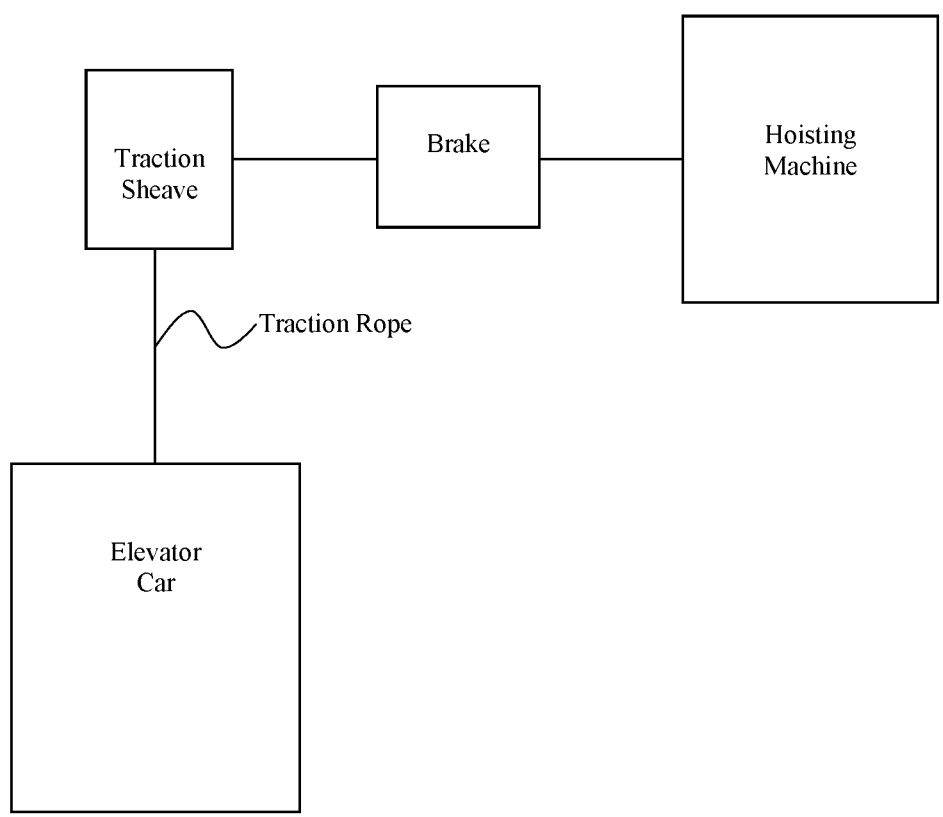
FIG. 4 presents a block diagram of an elevator system including the brake of FIG. 1.

FIG. 4 presents an elevator system. The elevator system includes an elevator car, a hoisting machine, and a traction rope traveling via a traction sheave of the hoisting machine. The elevator car is moved, with the traction rope. The hoisting machine includes the brake of FIG. 1 for braking movement of the traction sheave of the hoisting machine.

It is obvious to the person skilled in the art that the different embodiments of the invention are not limited to the examples described above, but that they may be varied within the scope of the claims presented below.

What is claimed is:

1. A brake, comprising:
a frame part of the brake;
an armature part movably supported on the frame part, the armature part being configured to be movable between a braking position and a releasing position;
a limit switch attached to the frame part, a switching state of the limit switch changing at an operating point of the limit switch; and
a measuring pin movably supported on the frame part of the brake, the measuring pin being separate from the armature part and being connected to the limit switch, and being configured to engage by movement of the armature part in an operating direction of the limit switch, in an operating range between the braking position and the releasing position,
wherein, in the operating range, the operating point of the limit switch is configured to divide into sections of the operating range, the switching state of the limit switch in a first section indicating the braking position and the switching state of the limit switch in a second section indicating the releasing position,
wherein both the measuring pin and the limit switch are disposed in a space formed in the frame part of the brake, and
wherein a length of the measuring pin is less than a length of the space.

2. The brake according to claim 1, wherein the measuring pin is configured to engage with a detent surface of an air gap of the brake on the armature part side.

3. The brake according to claim 2, wherein the brake comprises a thruster spring fitted between the frame part of the brake and the measuring pin for engaging the measuring pin with the armature part.

4. The brake according to claim 2, wherein the measuring pin comprises an arrow-shaped tip part, the tip of the arrow-shaped tip part being configured to press against the armature part.

5. The brake according to claim 1, wherein the brake comprises a thruster spring fitted between the frame part of the brake and the measuring pin for engaging the measuring pin with the armature part.

6. The brake according to claim 5, wherein the measuring pin comprises an arrow-shaped tip part, the tip of the arrow-shaped tip part being configured to press against the armature part.

7. The brake according to claim 1, wherein the measuring pin comprises an arrow-shaped tip part, the tip of the arrow-shaped tip part being configured to press against the armature part.

8. The brake according to claim 1, wherein the measuring pin is separate from the limit switch.

9. The brake according to claim 1, wherein the brake comprises an adjustment device configured to adjust a distance of the limit switch from the armature part.

10. The brake according to claim 9, wherein the limit switch is fixed to the frame part with the adjustment device.

11. The brake according to claim 9, wherein the adjustment device comprises an adjusting plate, on to which the limit switch is fixed, and the adjusting plate is fixed to the frame part of the brake with adjustment screws the distance of the adjusting plate from the armature part being adjustable with the adjustment screws.

12. The brake according to claim 1, wherein the measuring pin is configured to slide along a guide surface in the frame part of the brake.

13. The brake according to claim 1, wherein the limit switch has an arm extending coaxially with the measuring pin.

14. An elevator system, comprising:
  an elevator car;
  a hoisting machine; and
  a traction rope traveling via a traction sheave of the hoisting machine, the elevator car being moved, with the traction rope,
  wherein the hoisting machine comprises the brake according to claim 1 for braking movement of the traction sheave of the hoisting machine.

15. The brake according to claim 1, wherein the limit switch includes an arm extending coaxially with the measuring pin.

* * * * *